Jan. 22, 1957  E. R. GRAY  2,778,181
ROLLER ATTACHMENT FOR TRACTORS
Filed Sept. 13, 1954

INVENTOR.
Elzie R. Gray
BY
ATTORNEY.

United States Patent Office 2,778,181
Patented Jan. 22, 1957

2,778,181

ROLLER ATTACHMENT FOR TRACTORS

Elzie R. Gray, Kansas City, Mo.

Application September 13, 1954, Serial No. 455,389

4 Claims. (Cl. 55—6)

This invention relates to pressing structure particularly in the nature of an attachment for tractors and the like, and has for its primary object the provision of a unique arrangement of parts permitting utilization of the tractor itself for supplying weight to a roller when the latter is shifted to a position interposed between wheels of the tractor and the ground or other surface to be pressed.

Weighted rollers of all types have heretofore been proposed and satisfactorily placed in use and the prior disclosures have also set forth many ways of conveniently mounting the roller means on a tractor or as a removable attachment. The prior art even goes so far as to teach how such roller means may be shifted to and from a position engaging the ground and how the tractor may be utilized to supply pressing weight.

So far as I am aware however, there has never been proposed a construction wherein the roller means is interposed between the wheels of the tractor and the ground, particularly so that the entire implement is advanced by driving the roller means through the driven wheels of the tractor.

It is the most important object of the instant invention, therefore, to provide roller means so reciprocably mounted on the tractor as to be movable to and from a position interposed between the rear wheels of the tractor and the ground so that as the tractor is driven, the roller means is caused to rotate and the tractor supplies the needed weight for the roller means.

Other objects include the way in which the roller means is made and mounted so as to be reciprocable to and from an operable position whereby the same is carried by the tractor when not in use.

Figure 1:
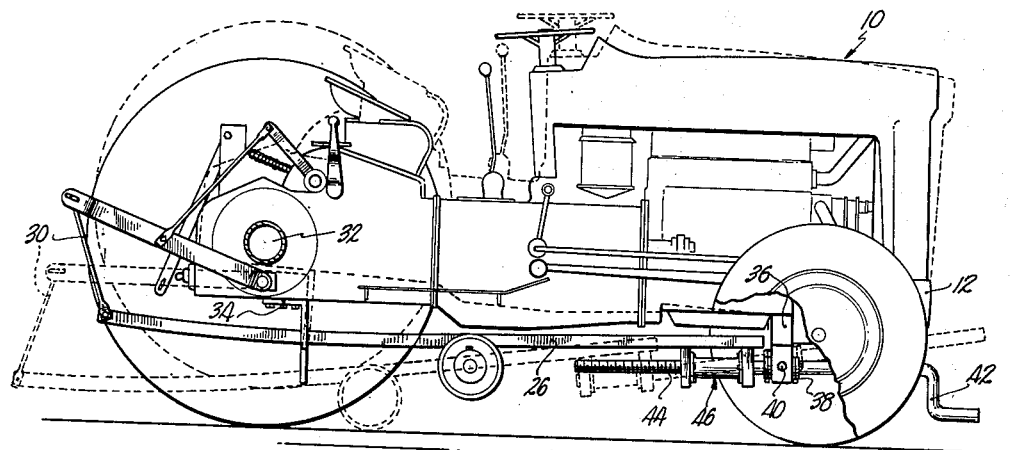
Figure 1 is a side elevational view of a tractor showing a roller attachment therefor made pursuant to the principles of the instant invention.
Figure 2:
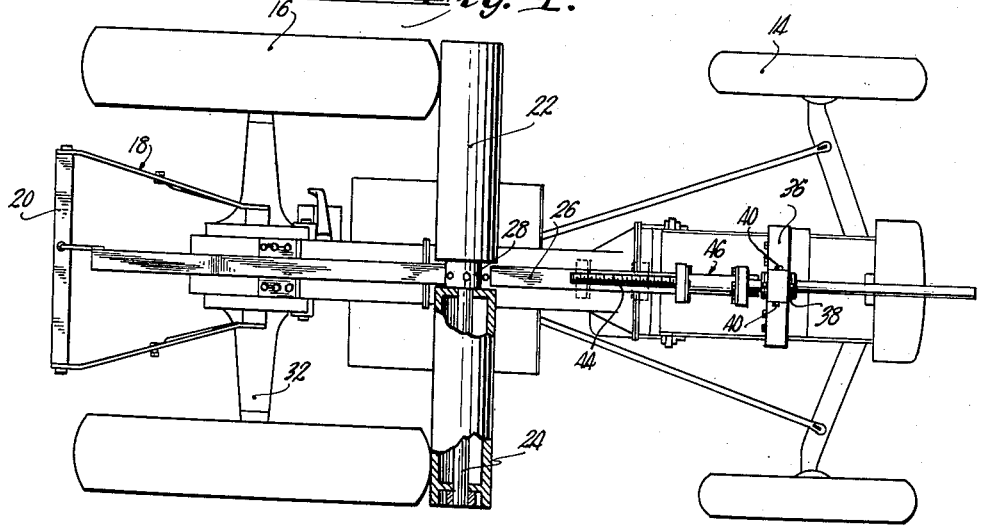
Fig. 2 is an inverted view of the tractor and the roller attachment mounted thereon.

The tractor shown in Figs. 1 and 2 of the drawing and chosen for illustration of one form of roller attachment made according to the present invention, is broadly designated by the numeral 10 and includes a main frame 12 in the usual manner, together with front wheels 14, rear wheels 16 and a power lift 18 having a drawbar 20.

There is provided an elongated roller 22 for each wheel 16 respectively, mounted for rotation on a common horizontal shaft 24. Shaft 24 is in turn secured to a relatively long bar 26 disposed medially and longitudinally of the tractor 10 therebelow. The bar 26 is interposed between the rollers 22 and shaft 24 is held in place in any suitable manner such as by a bracket or bearing 28 secured to the bar 26.

The rearmost end of the bar 26 is pivotally coupled with the drawbar 20 through use of a short link 30, it being noted that bar 26 passes beneath the rear axle 32 of tractor 10 and is guided in its vertical swinging movement by a slotted bracket 34 rigid to the tractor 10.

Bar 26 is mounted at its forwardmost end for reciprocation on its longitudinal axis by means of a bracket 36 depending from the frame 12 between the front wheels 14. A thrust bearing 38 mounted on the bracket 36 for swinging movement on a horizontal axis 40, rotatably receives a crank rod 42. Crank rod 42 has external threads 44 in mesh with a follower or nut means 46 threaded thereon and rigid to the bar 26 therebelow at the forwardmost end of the latter.

Thus, when the tractor 10 and the roller attachment are positioned as shown by full lines in Fig. 1, rear wheels 16 of the tractor 10 rest upon the ground, and the rollers 22 are supported by the tractor 10 above the level of the ground and between the wheels 14 and 16.

When it is desired to place the roller attachment in use, it is but necessary for the operator to lower the power lift mechanism 18, and therefore, the drawbar 20 to lower the rearmost end of the bar 26 to the dotted line position shown in Fig. 1. Additionally, the operator manipulates the crank rod 42 in a direction to cause the follower means 46 and, therefore, the bar 26, to move rearwardly until the rollers 22 come into engagement with the wheels 16. Continued manipulation of the crank rod 42 forces the rollers 22 beneath the wheels 16 until the latter are raised to the dotted line position shown in Fig. 1. As the rollers 22 are forced beneath the rear wheels 16, both the rollers 22 and the rear wheels 16 rotate relatively and the rearmost end of the tractor 10 is easily and quickly raised to the dotted line position shown in Fig. 1. Thereupon the tractor 10 is operated in the usual manner to drive the rear wheels 16, thereby causing rotation of the rollers 22 because of the frictional engagement between the wheels 16 and the rollers 22 causing advancement of the tractor and the attachment thereon.

Manifestly, forward movement of the tractor 10 takes place when it is in reverse gear, whereas reverse movement is caused by placing the tractor in a normally forward gear.

In addition to utilization of the tractor itself as the motive power for rotating the rollers 22, the tractor supplies the necessary pressing weight for the rollers 22 making the attachment ideally suitable for various operations such as lawn rolling and other tasks including road building and similar construction jobs. During road travel, the rollers 22 are supported and carried by the tractor 10 whenever the crank rod 42 is manipulated to move the rollers 22 forwardly to the position shown in full lines by Fig. 1 and when the lift mechanism 18 is elevated to raise the rearmost end of the bar 26.

Figure 3:
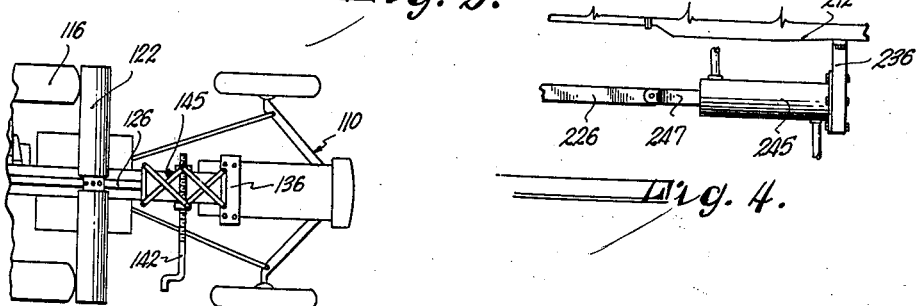
Fig. 3 is a fragmentary view similar to Fig. 2 illustrating a modification of the invention.

In lieu of the construction shown in Figs. 1 and 2 of the drawing for causing reciprocation of the bar 26, there is shown an alternate arrangement in Fig. 3 which includes a collapsible jack 145 that may be in the nature of a lazy-tongs linkage interconnecting bracket 136 on tractor 110 and bar 126 for rollers 122. Upon manipulation of a laterally extending crank rod 142, the jack 145 is operated to shift the rollers 122 to and from an operative position relative to wheels 116 of tractor 110.

Figure 4:
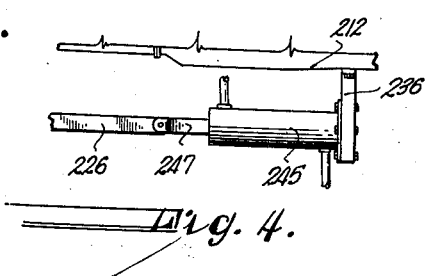
Fig. 4 is a fragmentary, side elevational view illustrating still another embodiment of the invention.

Another modification permitting operation from the seat of the tractor is shown in Fig. 4 of the drawing and includes a double-acting fluid cylinder 245 mounted on a bracket 236 depending from tractor frame 212. Cylinder 245 has a reciprocable piston (not shown) therewithin in the usual manner provided with a rearwardly extending stem 247 pivotally connected to the forwardmost end of bar 226 comparable to bars 26 and 126.

By use of usual valving controls it is possible to direct fluid to either end of the cylinder 245, causing reciprocation of the piston therewithin and thereby shifting rollers mounted on the bar 226 to and from an operative position with respect to the rear wheels of the tractor.

Having thus described the invention what is claimed as new and desired to be secured by Letters Patent is:

1. In a pressing attachment for tractors having a power lift at the rearmost end thereof and a pair of rear, driven wheels normally engaging the ground, an elongated tongue beneath the tractor and between the wheels in substantial parallelism with the normal path of travel of the tractor; a horizontal axle intersecting said path of travel and secured to the tongue therebeneath and intermediate the ends thereof, forwardly of the center of the wheels; a roller for each wheel respectively rotatably mounted on the axles, one on each side repectively of the tongue, and having a portion in the path of the wheel; manually actuated structure at the forward end of the tongue interconnecting the tongue and the tractor for reciprocating the tongue to force the rollers into and out of frictional engagement with the wheels therebeneath whereby the tractor supplies pressing weight for said rollers and the means for driving the same, said structure pivotally connecting the tongue for vertical swinging movement relative to the tractor; a slotted bracket depending from the tractor between said wheels and engaging the tongue for holding the same against lateral horizontal swinging the relative to the tractor; and means at the rear end of said tongue coupling the tongue with said power lift for swinging the tongue vertically to raise the rollers when the same are moved forwardly from beneath the wheels.

2. In a pressing attachment as set forth in claim 1 wherein said structure comprises a screw-threaded crank rod rotatably and swingably attached to the tractor and a follower on the rod secured to the tongue.

3. In a pressing attachment as set forth in claim 1 wherein said structure comprises a jack having a lazy tongs linkage interconnecting the tongue and the tractor, and a laterally-extending crank rod operably coupled with said linkage.

4. In a pressing attachment as set forth in claim 1 wherein said structure comprises a double-acting, hydraulic piston and cylinder assembly mounted on the tractor and pivotally coupled with the tongue.

References Cited in the file of this patent

UNITED STATES PATENTS

| | | |
|---|---|---|
| 1,636,997 | Helmling | July 26, 1927 |
| 1,939,258 | Ervin | Dec. 12, 1933 |
| 2,695,486 | Hospe | Nov. 30, 1954 |

FOREIGN PATENTS

| | | |
|---|---|---|
| 173,973 | Austria | Feb. 10, 1953 |